Patented Feb. 3, 1931

1,791,434

UNITED STATES PATENT OFFICE

HANS SCHMIDT, OF VOHWINKEL, NEAR ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CYANAMIDE-FORMALDEHYDE CONDENSATION PRODUCT AND PROCESS OF MAKING SAME

No Drawing. Application filed July 11, 1928, Serial No. 292,013, and in Germany September 10, 1924.

The present invention concerns a new compound of cyanamide which can be obtained by causing cyanamide to react with formaldehyde. The process can be carried out in aqueous solution, in particular with the use of an aqueous extract of crude calcium cyanamide and if desired, in the presence of condensing agents, such as alkali.

Technically it is of particular value that the process can be carried out in aqueous solution and gives a very large yield. This renders possible, for example, an almost quantitative precipitation of cyanamide from an aqueous extract of crude calcium cyanamide. The reaction proceeds spontaneously even in a neutral solution, but is considerably accelerated by the addition of alkali.

The following example will illustrate my invention, without limiting it thereto:

*Example 1.*—In an extract of crude calcium cyanamide, obtained in the customary manner by treatment of crude calcium cyanamide with water and containing 150 parts by weight of cyanamide, the lime is nearly neutralized by the addition of hydrochloric acid. 435 parts by weight of a 40 per cent aqueous formaldehyde solution are then added; the reaction begins after a short time and the temperature of the liquid increases somewhat. The condensation product separates as a thick magma, and finally the solution contains no more free cyanamide. After cooling, filtering and washing, the resulting product forms a bulky amorphous powder. On heating it decomposes without melting, giving off a fishy smell; it is only slightly soluble in water and insoluble in most organic solvents. It dissolves, for example, in very dilute hydrochloric acid and dilute formic acid. Under certain conditions such solutions gelatinize. The product also dissolves in caustoc soda solution on heating.

The calcium combined with the cyanamide and present in the crude calcium cyanamide extract can also be removed before the reaction, for example, by precipitation with sulfuric acid and filtration. When the calcium has not been thus precipitated or neutralized, as above described, by the addition of hydrochloric acid, it is precipitated in the reaction together with the new product.

It has been pointed out above that the reaction is considerably accelerated by the addition of alkali. According to the process of the example, the reaction liquid is kept weakly alkaline by incomplete neutralization of the crude calcium cyanamide solution with hydrochloric acid before formaldehyde is added. The alkaline reaction can also be produced by other alkalies, if desired, also by amines, pyridine and the like. When the solution is neutralized prior to the reaction, a longer time is required for the reaction to begin and for the completion of the reaction. However, it can be accelerated by heat and when heated the solution becomes weakly alkaline.

I claim:

1. The process of manufacturing a new compound of cyanamide, which process comprises reacting upon cyanamide with formaldehyde.

2. The process of manufacturing a new compound of cyanamide, which process comprises reacting upon cyanamide with formaldehyde in an aqueous solution.

3. The process of manufacturing a new compound of cyanamide, which process comprises reacting upon cyanamide with formaldehyde in an aqueous solution while heating.

4. The process of manufacturing a new compound of cyanamide, which process comprises reacting upon cyanamide with formaldehyde in an aqueous solution in the presence of a basically reacting condensing agent.

5. The process of manufacturing a new compound of cyanamide, which process comprises reacting upon cyanamide with formaldehyde in a dilute alkaline aqueous solution.

6. The process of manufacturing a new compound of cyanamide, which process comprises reacting upon an aqueous extract of crude calcium cyanamide with formaldehyde.

7. The process of manufacturing a new compound of cyanamide, which process comprises nearly neutralizing an aqueous extract of crude calcium cyanamide and adding to the extract an aqueous solution of formaldehyde.

8. The process of manufacturing a new compound of cyanamide, which process comprises adding to an aqueous extract of crude calcium cyanamide such an amount of hydrochloric acid that the reaction mixture reacts weakly alkaline and reacting upon the solution obtained with an aqueous solution of formaldehyde.

9. The process of manufacturing a new compound of cyanamide, which process comprises adding to an aqueous extract of crude calcium cyanamide such an amount of sulfuric acid that the reaction remains weakly alkaline and reacting upon the solution after filtration from the precipitated calcium sulfate with an aqueous solution of formaldehyde.

10. The new condensation product of cyanamide with formaldehyde obtainable by reacting upon cyanamide with formaldehyde in an alkaline reacting aqueous solution, said product being a bulky amorphous powder, which decomposes on heating without melting, being slightly soluble in water and being insoluble in the usual organic solvents, being soluble in dilute hydrochloric acid and dilute formic acid and soluble in hot caustic soda solution.

In testimony whereof I have hereunto set my hand.

HANS SCHMIDT. [L. S.]